July 5, 1949.                    D. E. BOVEY                    2,474,886
                          ELECTRONIC PHASE SHIFTER
                             Filed Dec. 4, 1944

INVENTOR.
DONALD E. BOVEY
BY Carlson, Pitzner, Hubbard & Wolfe
                              ATTORNEYS.

Patented July 5, 1949

2,474,886

UNITED STATES PATENT OFFICE 2,474,886

ELECTRONIC PHASE SHIFTER

Donald E. Bovey, Rockford, Ill., assignor to Woodward Governor Company, Rockford, Ill., a corporation of Illinois Application December 4, 1944, Serial No. 566,628

6 Claims. (Cl. 323—119)

The present invention pertains to phase shifters, that is to say, to apparatus used for controllably altering the phase of one alternating current voltage with respect to another.

One general object of the invention is to provide a phase shifter operable in response to changes in a direct current control potential and in which the time lag is eliminated which has been encountered in heretofore available devices for such purpose employing a saturable core reactor in which the degree of saturation is varied by the direct current control potential.

More particularly, it is an object to provide a phase shifter embodying electronic discharge devices incorporated in a suitable bridge type network and utilizing changes in conductivity of the devices effected by controllable variation of a direct current potential applied to their control grids for varying the phase of the alternating current output voltage of the bridge.

Further objects and advantages of the invention will become apparent as the following description proceeds, taken in connection with the accompanying drawings in which.

Figure 1:
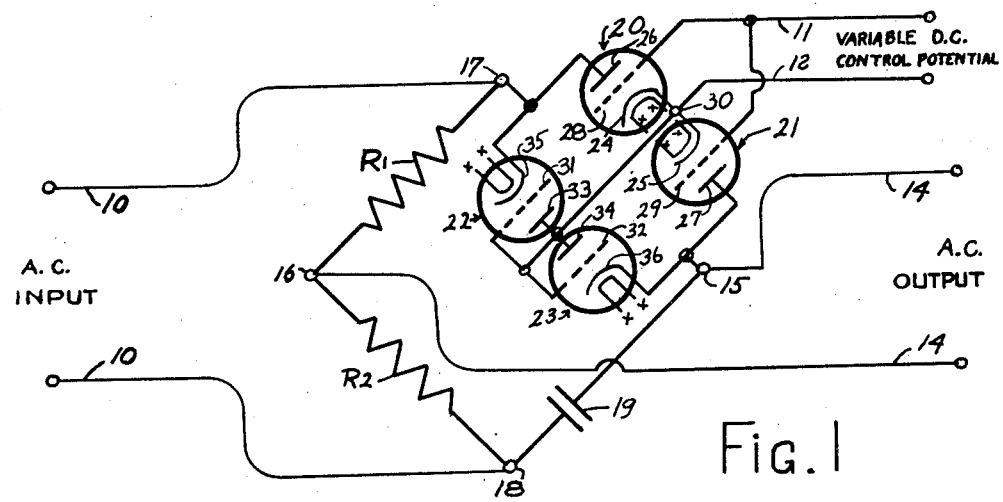
Figure 1 is a wiring diagram of a phase shifter embodying the present invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the network shown in Fig. 1 is, in general, adapted to alter controllably the phase of the alternating current output potential across leads 14 in accordance with changes in a direct current control potential applied across leads 11, 12, alternating current being supplied to the network through leads 10. The network comprises a bridge having output terminals 15, 16 and input terminals 17, 18.

In the preferred form of bridge shown, two of the legs consist of respective resistors R1, R2 of equal value. The other two legs consist, respectively, of a reactance, here shown as being capacitive and comprising a condenser 19, and a plurality of electronic discharge devices. The latter are arranged to vary the conductivity of the bridge leg in which they are incorporated in response to changes in the control potential across 11, 12.

In the present instance two pairs of electronic discharge devices 20, 21 and 22, 23 are employed. The first pair (20, 21) are shown as being triodes, having respective cathodes 24, 25, anodes 26, 27, and control grids 28, 29. The anodes 26, 27 of these devices are connected respectively to terminals 17, 15 at opposite ends of the bridge leg in which the electronic discharge devices are located. The cathodes 24, 25 of this pair of discharge devices are, on the other hand, connected together at 30. The devices 20, 21 are thus reversely connected with respect to each other in the bridge leg so that only alternate ones of them can pass current during corresponding alternate half cycles for the alternating current potential applied to them. This may be conveniently referred to as a "back-to-back" connection.

For each alternate half cycle of alternating current potential applied across the discharge devices 20, 21 the polarity of the voltage across one device of the pair will be such, with reference to its electrodes, that it passes no current. It is to automatically by-pass or shunt such idle one of the pair of discharge devices 20, 21 during respective half cycles that the other pair of discharge devices 22, 23 is provided. For that purpose the devices 22, 23 operate primarily as diodes, although in the particular circuit illustrated they happen to have been shown as diode connected triodes, their grids 31, 32 being connected to their respective anodes 33, 34. The cathodes 35, 36 of these devices are connected to respective terminals 17, 15 of the bridge leg, while the anodes 33, 34 are connected together and to the connected cathodes 24, 25 of the other pair of discharge devices 20, 21.

With the discharge devices so connected, the device 22 will pass current when the device 20 is idle, thus connecting the cathode 25 of the device 21 to the terminal 17, whereas the device 23 will pass no current during that time. In the next succeeding half cycle of applied alternating potential the reverse polarity will cause the device 20 to become conductive and the device 21 to become non-conductive. At the same time, the device 23 becomes conductive, connecting the cathode 24 of the device 20 to the terminal 15, whereas the device 22 becomes non-conductive. Current thus threads its way through the leg of the bridge comprised by the electronic discharge devices, passing through the devices 21, 22 in alternate half cycles and through the devices 20, 23 in the remaining half cycles.

By controllably altering the conductivity of the discharge devices 20, 21 the conductivity of the bridge leg in which these devices are incorporated may be correspondingly altered. For that purpose the control grids 28, 29 of these devices are connected to the control potential lead 11, while the cathodes 24, 25 are connected to the companion lead 12. By altering the magnitude of the direct current control potential applied at 11, 12, the conductivity of the devices 20, 21 may thus be altered at will and substantially in unison.

The electronic discharge devices 20 to 23 may be separate vacuum tubes as indicated, or may, of course, be paired in their envelopes in the form of duplex tubes. Type 6C5 tubes are, among others, suitable for the purpose. In any event, tubes having indirectly heated cathodes should be employed in the circuit illustrated. For the sake of simplicity of illustration, the heater connections have been omitted but all of the heater terminals XX may be of course connected to a common source of suitable potential.

Figure 2:
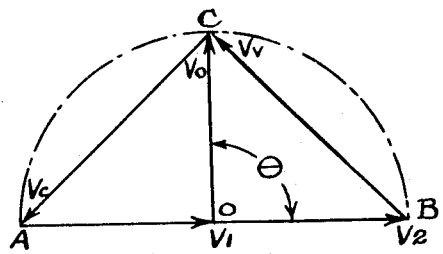
Figs. 2 and 2a are vector diagrams for the phase shifter of Fig. 1 indicating its operation under two respectively different conditions of control potential.
Figure 2A:
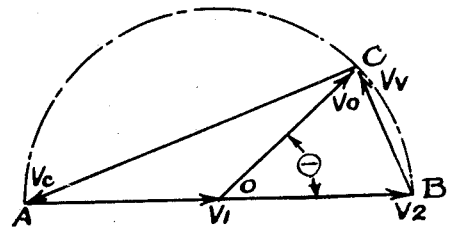

The operation of the disclosed phase shifter is indicated approximately by the vector representations in Figs. 2 and 2a. The vector $V_o$ represents the output voltage, whereas the input voltage is represented by the line AB, the same being comprised of the vectors $V1$, $V2$. The latter voltage $V1$, $V2$ are the drops across the resistors $R1$, $R2$ respectively, which for convenience of analysis and illustration have been shown as resistors of equal value. The voltage drops across the capacitive leg and tube leg of the bridge are represented by the vectors $Vc$ and $Vv$ respectively. Accordingly, when $Vc$ is equal to $Vv$, or in other words when the impedance of the tube leg of the bridge equals that of the capacitive leg, the output voltage $Vo$ is of one-half the magnitude of the input voltage and is displaced from it by a phase angle $\theta$ (Fig. 2).

Assuming constancy for the frequency and magnitude of the input potential, and zero output current, the output potential remains constant in magnitude by shifts in phase in accordance with changes in relative magnitude of $Vv$ and $Vc$. Thus, the output voltage vector $Vo$, represented by line OC, swings about the center O, relative to line AB so that the locus of C is a circle centered at O.

More particularly, upon altering the grid potential of the discharge devices 20, 21 to increase their plate currents, the effective impedances of these devices are lowered. Consequently $Vv$ decreases so that the phase angle decreases assuming, for example, the new value $\theta'$ of Fig. 2a. Alteration of the grid potential in an opposite sense to decrease the plate current from that prevailing under the mean conditions represented in Fig. 2 serves, of course, to increase the phase angle rather than decrease it.

From the foregoing, it will be seen that complete and accurate control of phase is accomplished through the use of a direct current control potential for the network. Since such control potential is applied to the input or grid circuits of the electronic discharge devices 20, 21, practically no current is drawn from the control potential source. Moreover, there is no time lag introduced into the system between the instant of change in direct current control potential and the instant of corresponding change in phase. This is true even though a condenser such as 19 be incorporated in the bridge, since the charging rate of this condenser has no effect on the speed of response of the network in shifting phase.

I claim as my invention:

1. In a phase shifter, the combination of a multi-leg bridge network having in one leg thereof a pair of electronic discharge devices each including anode, cathode and grid electrodes arranged with their cathodes connected together and their anodes connected to respective end terminals of said one bridge leg for passage of current through alternate ones thereof in respective alternate half cycles of alternating current potential applied to such leg, means for applying a variable direct current control potential between the grid of each of said devices and its respective cathode to vary correspondingly the conductivity of said device, means for establishing a shunt about each of said devices only during the alternate half cycles in which such device is non-conductive, and a reactance in an adjacent leg of said bridge.

2. In a phase shifter, the combination of a multi-leg bridge network having in one leg thereof a pair of electronic discharge devices each including anode, cathode and grid electrodes serially connected in said leg reversely with respect to each other for passage of current through alternate ones thereof in respective alternate half cycles of alternating current potential applied to such leg, means for applying a variable direct current control potential between the grid of each of said devices and its respective cathode to vary correspondingly the conductivity of said device, means for establishing a shunt about each of said devices only during the alternate half cycles in which such device is non-conductive, and a reactance in an adjacent leg of said bridge.

3. In a phase shifter, the combination of a multi-leg bridge network having in one leg thereof a pair of electronic discharge devices each including anode, cathode and grid electrodes, said discharge devices being connected serially back-to-back in said leg for passage of current through alternate ones thereof in respective alternate half cycles of alternating current potential applied to such leg, means for applying a variable direct current control potential between the grid of each of said devices and its respective cathode to vary correspondingly the conductivity of said device, means for establishing a shunt about each of said devices only during the alternate half cycles in which such device is non-conductive, said last-mentioned means including a further pair of electronic discharge devices each including an anode and a cathode arranged with their anodes connected together and to said cathodes of the first-mentioned pair of devices and with the cathodes of said second pair of devices connected to respective end terminals of said one bridge leg, and a reactance in an adjacent leg of said bridge.

4. An electronic phase shifter comprising, in combination, a quadrilateral bridge having a pair of input terminals and a pair of output terminals for connection, respectively, to an alternating current source and to an output circuit, the phase of whose potential is to be controlled with reference to the input potential from said source, one pair of legs of said bridge being connected end-to-end with respect to each other across said input terminals consisting of respective substantially equal resistors, a third leg of said bridge including a reactance, the fourth leg of said bridge having therein two pairs of electronic discharge devices, each device including anode and cathode electrodes arranged with the anodes of each device in one pair connected, respectively, to the input and output terminals at opposite ends of said fourth leg and the cathodes of each device in the other pair of said devices connected to respective ones of such terminals, the remaining anode or cathode of each device, as the case may be, all being connected together, the devices of said one pair of devices also each having grid electrodes, and means for applying a variable direct current control potential between each of said grids and its respective cathode.

5. An electronic phase shifter comprising, in combination, a quadilateral bridge having a pair of input terminals and a pair of output terminals for connection, respectively, to an alternating current source and to an output circuit, the phase of whose potential is to be controlled with reference to the input potential from said source, one pair of legs of said bridge being connected end-to-end with respect to each other across said input terminals consisting of respective substantially equal resistors, a third leg of said bridge including a condenser, the fourth leg of said bridge having therein two pairs of electronic discharge devices, each device including anode and cathode electrodes arranged with the anodes of each device in one pair connected, respectively, to the input and output terminals at opposite ends of said fourth leg and the cathodes of each device in the other pair of said devices connected to respective ones of such terminals, the remaining anode or cathode of each device, as the case may be, all being connected together, the devices of said one pair of devices also each having grid electrodes, and means for applying a variable direct current control potential between each of said grids and its respective cathode.

6. In a phase shifter of the Wheatstone bridge type having four legs, the combination of first and second legs having substantially equal resistance and a common terminal therebetween, a third leg having capacitance included therein, a fourth leg having means including vacuum tubes for conducting current in both directions, at least a portion of said vacuum tubes having control grids, and means for varying the amplitude of such conducted current by application of an adjustable D. C. control potential to the control grids of said tubes so that the A. C. voltage existing across the bridge output terminals upon application of A. C. voltage to the bridge input terminals may be varied in phase.

DONALD E. BOVEY.

REFERENCES CITED

The following references are of record in the file of this patent:

UNITED STATES PATENTS

| Number | Name | Date |
| --- | --- | --- |
| 1,893,780 | Lyman | Jan. 10, 1933 |
| 2,078,152 | Moyer | Apr. 20, 1937 |
| 2,085,940 | Armstrong | July 6, 1937 |
| 2,292,159 | Richardson | Aug. 4, 1942 |
| 2,316,044 | Blair | Apr. 6, 1943 |

FOREIGN PATENTS

| Number | Country | Date |
| --- | --- | --- |
| 416,909 | Great Britain | Nov. 28, 1932 |